US011997059B1

(12) United States Patent
Su et al.

(10) Patent No.: US 11,997,059 B1
(45) Date of Patent: May 28, 2024

(54) COMPREHENSIVE PRIVACY CONTROL FOR MONITORING REQUESTS SENT TO ARTIFICIAL INTELLIGENCE CHATBOTS

(71) Applicant: International Business Machines Corporation, Armonk, NY (US)

(72) Inventors: Jun Su, Beijing (CN); Su Liu, Austin, TX (US); Guang Han Sui, Beijing (CN); Peng Hui Jiang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/233,212

(22) Filed: Aug. 11, 2023

(51) Int. Cl.
*H04L 51/02* (2022.01)
*G06F 40/35* (2020.01)
*H04L 51/063* (2022.01)
*H04L 51/212* (2022.01)

(52) U.S. Cl.
CPC ............ *H04L 51/02* (2013.01); *G06F 40/35* (2020.01); *H04L 51/063* (2013.01); *H04L 51/212* (2022.05)

(58) Field of Classification Search
CPC ..... H04L 51/02; H04L 51/212; H04L 51/063; G06F 40/35
USPC ....................................................... 709/206
See application file for complete search history.

(56) References Cited

U.S. PATENT DOCUMENTS

| 10,936,826 B2 * | 3/2021 | Liu .................. G06F 40/40 |
| 11,361,211 B2 | 6/2022 | Manaharlal Kakkad et al. |
| 11,552,974 B1 | 1/2023 | Bagga et al. |
| 11,823,667 B2 * | 11/2023 | Penneru .................. G06N 5/04 |
| 2018/0024972 A1 | 1/2018 | Gosukonda et al. |
| 2019/0392285 A1 * | 12/2019 | Manaharlal Kakkad ..................... H04L 51/02 |
| 2020/0278934 A1 * | 9/2020 | Hillier ............... G06F 16/90344 |
| 2021/0326537 A1 * | 10/2021 | Liu ......................... G06F 40/47 |
| 2021/0333949 A1 * | 10/2021 | Malhotra ............ G06F 3/04842 |
| 2022/0207442 A1 | 6/2022 | Sarkar |
| 2022/0286482 A1 | 9/2022 | Barday et al. |
| 2023/0124288 A1 * | 4/2023 | Meier-Hellstern ... G06N 3/0455 706/12 |
| 2023/0359911 A1 * | 11/2023 | Kapoor .................. G06N 5/043 |

FOREIGN PATENT DOCUMENTS

WO 2021212339 A1 10/2021

OTHER PUBLICATIONS

Alt-Mlouk et al., "Fedbot Enhancing Privacy in Chatbots with Federated Learning," arXiv, 2023, 13 pages, retrieved from https://doi.org/10.48550/arXiv.2304.03228.

(Continued)

*Primary Examiner* — Glenford J Madamba
(74) *Attorney, Agent, or Firm* — Zilka-Kotab, P.C.

(57) ABSTRACT

A computer-implemented method, according to one implementation, includes: monitoring requests received for an AI interface prompt in real-time, and determining whether one or more of the requests violate compliance metrics. Risk scores are calculated for requests determined as violating the compliance metrics. The requests determined as violating the compliance metrics are updated by implementing protective measures correlated with the calculated risk scores. Moreover, the updated requests are sent to the AI interface prompt.

13 Claims, 8 Drawing Sheets

(56) References Cited

OTHER PUBLICATIONS

Harkous et al., "PriBots: Conversational Privacy with Chatbots," Workshop on the Future of Privacy Indicators, at the Twelfth Symposium on Usable Privacy and Security (SOUPS), Jun. 22-24, 2016, pp. 1-6.

Tarantola, A., "OpenAI says a bug leaked sensitive ChatGPT user data," engadget, Mar. 24, 2023, 6 pages, retrieved from https://www.engadget.com/the-9995-fuell-fllow-electric-motorcycle-is-available-for-pre-order-today-220016821.html.

Aadeetya, S., "OpenAI Chief Confirms ChatGPT Bug Leaked User Conversations: Know More," News 18, Mar. 23, 2023, 6 pages, retrieved from https://www.news18.com/tech/chatgpt-chief-confirms-bug-leaked-user-conversations-know-more-7368751.html.

Adam et al., "AI-based chatbots in customer service and their effects on user compliance," Electronic Markets, vol. 31, 2021, pp. 427-445.

\* cited by examiner

COMPREHENSIVE PRIVACY CONTROL FOR MONITORING REQUESTS SENT TO ARTIFICIAL INTELLIGENCE CHATBOTS

BACKGROUND

The present invention relates to artificial intelligence (AI) chatbots, and more specifically, this invention relates to comprehensive privacy control to monitor requests sent to AI chatbots.

Chatbots have historically included text-based applications, programmed to reply to a limited set of queries with preprogrammed answers. Accordingly, these conventional chatbots have limited functionality and are unable to process questions that do not correspond to preset responses. Over time however, chatbots have integrated more rules and natural language processing, providing more conversational characteristics to the interface.

AI interfaces have emerged in recent years, providing users the ability to submit various requests (e.g., questions) that are evaluated and answered in real-time. For example, AI chatbots have been developed over time to simulate human conversation. It should be noted that "AI chatbot" is an umbrella term which refers to different types of AI-based interfaces that can provide responses to various queries that are entered. In other words, AI chatbots may include any software applications that aim to mimic human conversation using text or voice interactions to respond to queries that are submitted by users. These interactions typically extend across an online connection and involve AI systems that are capable of maintaining a conversation with the users.

SUMMARY

A computer-implemented method, according to one implementation, includes: monitoring requests received for an AI interface prompt in real-time, and determining whether one or more of the requests violate compliance metrics. Risk scores are calculated for requests determined as violating the compliance metrics. The requests determined as violating the compliance metrics are updated by implementing protective measures correlated with the calculated risk scores. Moreover, the updated requests are sent to the AI interface prompt.

A computer program product, according to another implementation, includes a computer readable storage medium having program instructions embodied therewith. The program instructions are readable by a processor, executable by the processor, or readable and executable by the processor, to cause the processor to: perform the foregoing method.

A system, according to yet another implementation, includes: a processor, and logic that is integrated with the processor, executable by the processor, or integrated with and executable by the processor. Moreover, the logic is configured to: perform the foregoing method.

Other aspects and implementations of the present invention will become apparent from the following detailed description, which, when taken in conjunction with the drawings, illustrate by way of example the principles of the invention.

DETAILED DESCRIPTION

Figure 1:
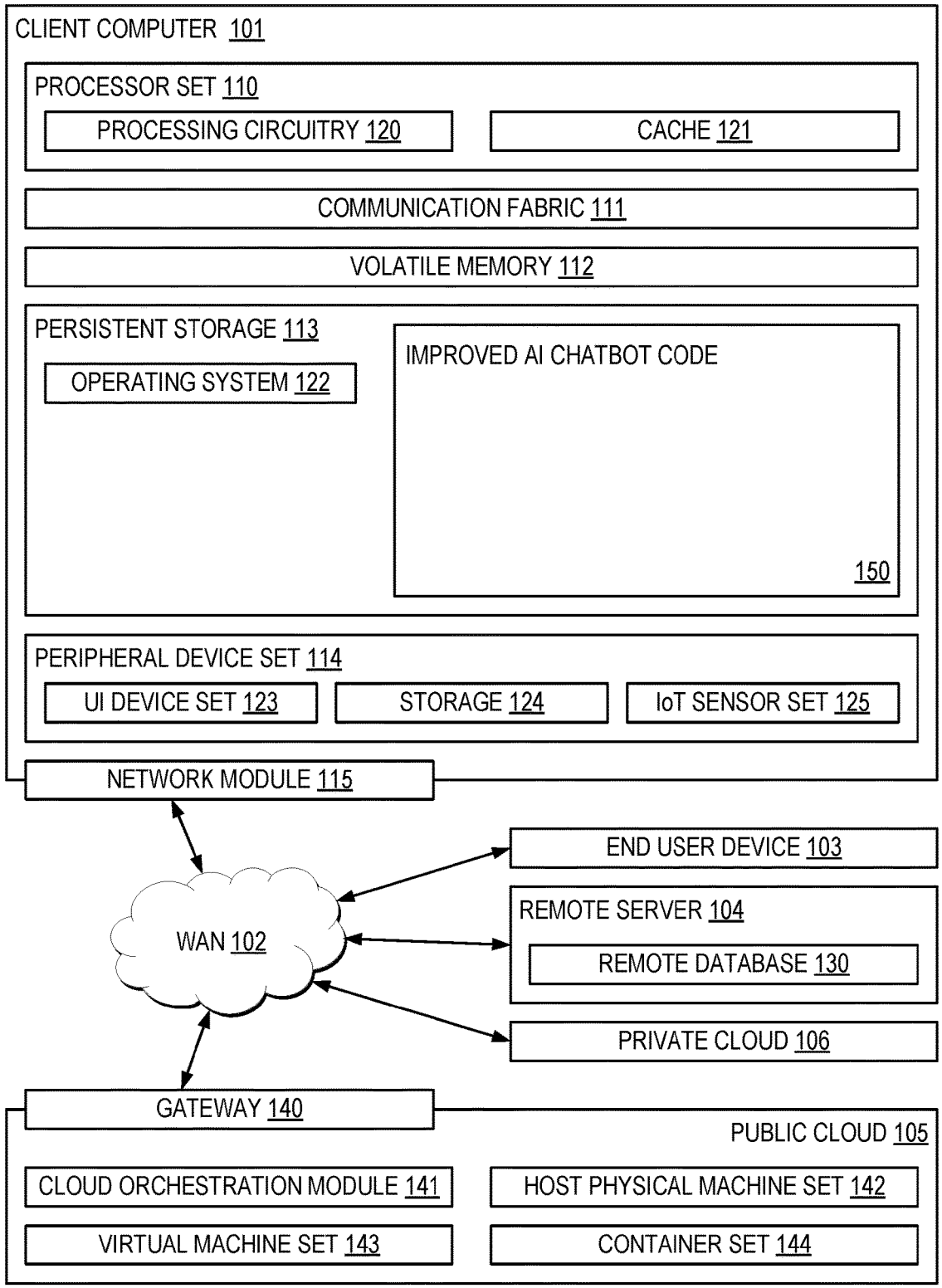
FIG. 1 is a diagram of a computing environment, in accordance with one approach.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred approaches of systems, methods and computer program products for implementing comprehensive privacy control to monitor requests sent to AI chatbots, thereby achieving an efficient and scalable monitoring system that is able to evaluate requests that are sent, even across a distributed system. Implementations herein are able to achieve this improved exchange of information at least in part by implementing different protective measures in an attempt to meet pertinent compliance metrics. Security of user data and other proprietary information may thereby be achieved by implementing approaches included herein, e.g., as will be described in further detail below.

In one general approach, a computer-implemented method includes: monitoring requests received for an AI interface prompt in real-time, and determining whether one or more of the requests violate compliance metrics. Risk scores are calculated for requests determined as violating the compliance metrics. The requests determined as violating the compliance metrics are updated by implementing protective measures correlated with the calculated risk scores. Moreover, the updated requests are sent to the AI interface prompt.

In another general approach, a computer program product includes a computer readable storage medium having program instructions embodied therewith. The program instructions are readable by a processor, executable by the processor, or readable and executable by the processor, to cause the processor to: perform the foregoing method.

In yet another general approach, a system includes: a processor, and logic that is integrated with the processor, executable by the processor, or integrated with and executable by the processor. Moreover, the logic is configured to: perform the foregoing method.

Various aspects of the present disclosure are described by narrative text, flowcharts, block diagrams of computer systems and/or block diagrams of the machine logic included in computer program product (CPP) approaches. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product implementation ("CPP implementation" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as improved AI chatbot code at block 150 for implementing comprehensive privacy control to monitor requests sent to AI chatbots. In addition to block 150, computing environment 100 includes, for example, computer 101, wide area network (WAN) 102, end user device (EUD) 103, remote server 104, public cloud 105, and private cloud 106. In this approach, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various approaches, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some implementations, storage 124 may take the form of a quantum computing storage device for storing data in the form of qubits. In implementations where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some implementations, network control functions and network forwarding functions of network module 115 are performed on the same physical hardware device. In other implementations (for example, implementations that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some implementations, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some implementations, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments.

Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other implementations a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this approach, public cloud 105 and private cloud 106 are both part of a larger hybrid cloud.

In some respects, a system according to various implementations may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Of course, this logic may be implemented as a method on any device and/or system or as a computer program product, according to various implementations.

As noted above, chatbots have historically included text-based applications, programmed to reply to a limited set of queries with preprogrammed answers. Accordingly, these conventional chatbots have limited functionality and are unable to process questions that do not correspond to preset responses. Over time however, chatbots have integrated more rules and natural language processing, providing more conversational characteristics to the interface.

AI interfaces have emerged in recent years, providing users the ability to submit various requests (e.g., questions) that are evaluated and answered in real-time. For example, AI chatbots have been developed over time to simulate human conversation. It should be noted that "AI chatbot" is an umbrella term which refers to different types of AI-based interfaces that can provide responses to various queries that are entered. In other words, AI chatbots may include any software applications that aim to mimic human conversation using text or voice interactions to respond to queries that are submitted by users. These interactions typically extend across an online connection and involve AI systems that are capable of maintaining a conversation with the users.

While the continued advancement of AI chatbots expands their applicability, the number of relevant security threats introduced has also increased. For example, users are typically unaware of the fact that AI chatbots collect information included in the queries that are submitted. This, combined with the broad applicability and conversational experience can lead users to inadvertently expose confidential information in questions presented to an AI chatbot. Moreover, AI chatbots can collect and process a significant amount of information received from users, thereby further increasing the likelihood of sensitive information being exposed.

In sharp contrast, implementations herein are able to improve data security while maintaining the broad applicability of AI chatbots and similar types of user interfaces. This is achieved by monitoring the requests that are submitted to an AI chatbot and comparing them against one or more compliance metrics. Accordingly, protective measures may be implemented in certain situations to prevent exposure of confidential information and other undesirable situations, e.g., as will be described in further detail below.

Figure 2:
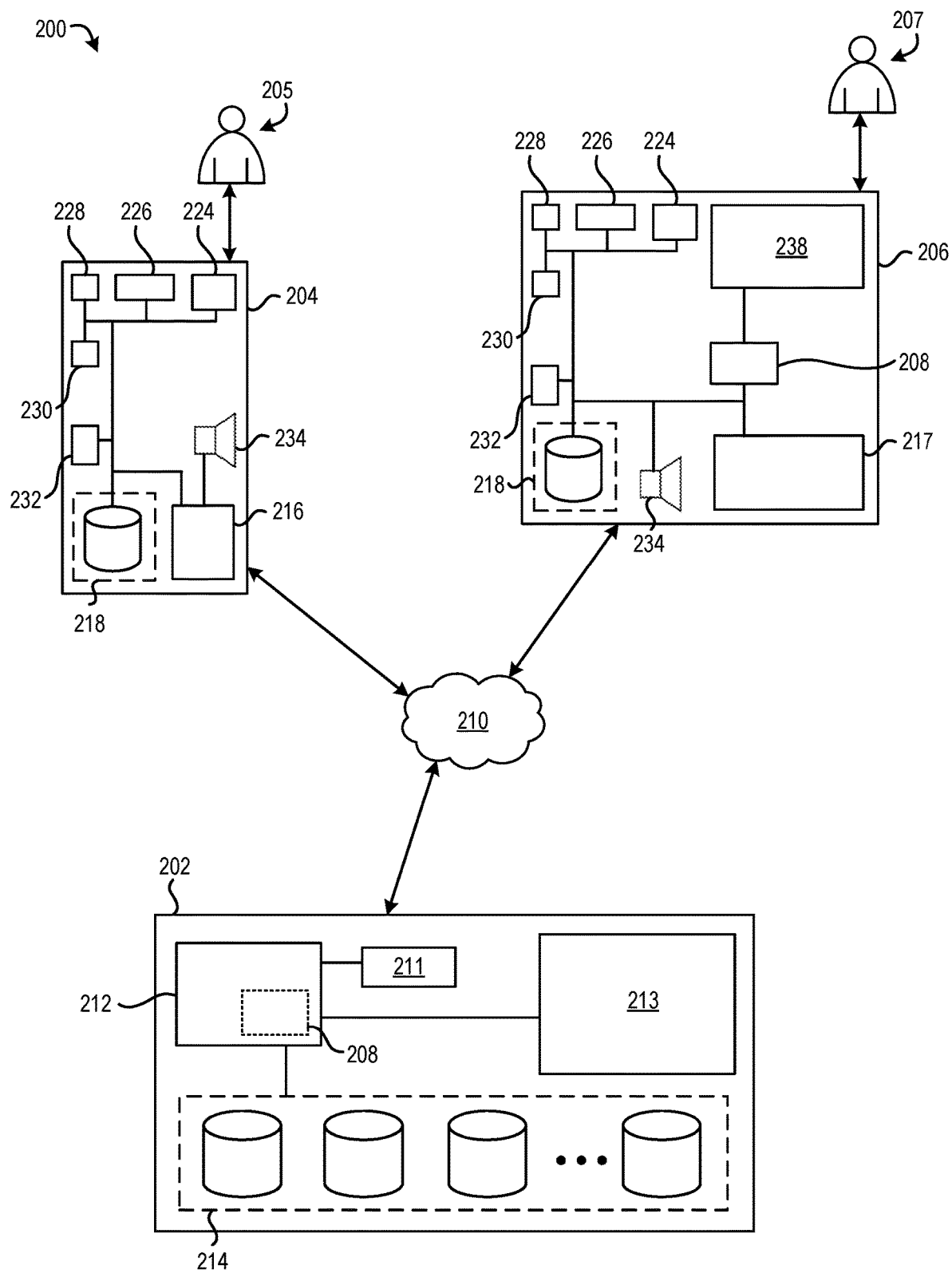
FIG. 2 is a representational view of a distributed system, in accordance with one approach.

Looking now to FIG. 2, a system 200 having a distributed architecture is illustrated in accordance with one approach. As an option, the present system 200 may be implemented in conjunction with features from any other approach listed herein, such as those described with reference to the other FIGS., such as FIG. 1. However, such system 200 and others presented herein may be used in various applications and/or in permutations which may or may not be specifically described in the illustrative approaches or implementations listed herein. Further, the system 200 presented herein may be used in any desired environment. Thus FIG. 2 (and the other FIGS.) may be deemed to include any possible permutation.

As shown, the system 200 includes a central server 202 that is connected to electronic devices 204, 206 accessible to the respective users 205, 207. Each of these electronic devices 204, 206 and respective users 205, 207 may be separated from each other such that they are positioned in different geographical locations. For instance, the central server 202 and electronic devices 204, 206 are connected to a network 210.

The network 210 may be of any type, e.g., depending on the desired approach. For instance, in some approaches the network 210 is a WAN, e.g., such as the Internet. However, an illustrative list of other network types which network 210 may implement includes, but is not limited to, a LAN, a PSTN, a SAN, an internal telephone network, etc. As a result, any desired information, data, commands, instructions, responses, requests, etc. may be sent between users 205, 207 using the electronic devices 204, 206 and/or central server 202, regardless of the amount of separation which exists therebetween, e.g., despite being positioned at different geographical locations.

However, it should be noted that two or more of the electronic devices 204, 206 and/or central server 202 may be connected differently depending on the approach. According to an example, which is in no way intended to limit the invention, two edge compute nodes may be located relatively close to each other and connected by a wired connection, e.g., a cable, a fiber-optic link, a wire, etc.; etc., or any other type of connection which would be apparent to one skilled in the art after reading the present description. The term "user" is in no way intended to be limiting either. For instance, while users are described as being individuals in various implementations herein, a user may be an application, an organization, a preset process, etc. The use of "data" and "information" herein is in no way intended to be limiting either, and may include any desired type of details, e.g., depending on the type of prompt (e.g., question) submitted by a user.

With continued reference to FIG. 2, the electronic devices 204, 206 are shown as having a different configuration than the central server 202. For example, in some implementations the central server 202 includes a large (e.g., robust) processor 212 coupled to a cache 211, a machine learning module 213, and a data storage array 214 having a relatively high storage capacity. The machine learning module 213 may include any desired number and/or type of machine learning models. In preferred approaches, the machine learning module 213 includes machine learning models that have been trained to provide rapid responses to questions as they are submitted. The machine learning models may further be configured to present the information in any desired format, style, language, etc. Accordingly, the machine learning module 213 may implement an AI chatbot configured to receive prompts (e.g., questions) from users 205, 207, analyze those prompts, and generate unique responses to the received prompts, e.g., as would be appreciated by one skilled in the art after reading the present description.

The processor 212 is also shown as including a prompt monitoring module 208 configured to monitor inputs that are received. The prompt monitoring module 208 may be used to monitor questions received from users and designated for an AI chatbot. As noted above, users may inadvertently include proprietary data or other types of sensitive information in questions that are submitted to an AI chatbot. The prompt monitoring module 208 thereby preferably inspects questions as they are submitted in real-time and determines whether they violate any compliance metrics. The prompt monitoring module 208 is thereby able to identify potential security breaches and take corrective actions according to adjustable compliance metrics. It follows that prompt monitoring module 208 may implement any one or more of the operations included in method 300 of FIG. 3A below.

With continued reference to FIG. 2, it follows that the prompt monitoring module 208 can monitor requests as they are received at the central server 202, e.g., from users 205, 207. Looking to electronic device 204, a processor 216 coupled to memory 218 receives inputs from and interfaces with user 205. For instance, the user 205 may input information using one or more of: a display screen 224, keys of a computer keyboard 226, a computer mouse 228, a microphone 230, and a camera 232. The processor 216 may thereby be configured to receive inputs (e.g., text, sounds, images, motion data, etc.) from any of these components as entered by the user 205. These inputs typically correspond to information presented on the display screen 224 while the entries were received. Moreover, the inputs received from the keyboard 226 and computer mouse 228 may impact the information shown on display screen 224, data stored in memory 218, information collected from the microphone 230 and/or camera 232, status of an operating system being implemented by processor 216, etc. The electronic device 204 also includes a speaker 234 which may be used to play (e.g., project) audio signals for the user 205 to hear.

Some inputs received from user 205 may be intended for an AI chatbot that is accessible to the user 205 through one or more applications, software programs, temporary communication connections, etc. For example, the user 205 may input questions on the keyboard 226 that are intended for an AI chatbot implemented at the machine learning module 213 of central server 202. The processor 216 may thereby direct questions received from user 205 over network 210, to central server 202. There, the questions are preferably reviewed by the prompt monitoring module 208 in real-time, before being sent to the machine learning module 213. There, an AI chatbot is able to process the questions and provide responses which are returned to the electronic device 204 and made available to the user 205, e.g., as will be described in further detail below.

Some of the components included in electronic device 206 may be the same or similar to those included in electronic device 204, some of which have been given corresponding numbering. For instance, controller 217 is coupled to memory 218, a display screen 224, keys of a computer keyboard 226, a computer mouse 228, a microphone 230, speaker 234, and camera 232.

Additionally, the controller 217 is coupled to a prompt monitoring module 208 and machine learning module 238. As described with respect to machine learning module 213, the machine learning module 238 may include any desired number and/or type of machine learning models. In preferred approaches, the machine learning module 238 includes machine learning models that have been trained to provide rapid responses to questions as they are submitted. The machine learning models may further be configured to present the information in any desired format, style, language, etc.

Accordingly, the machine learning module 238 may implement an AI chatbot configured to receive prompts (e.g., questions) from user 207, locally analyze those prompts, and locally generate unique responses to the received prompts. The machine learning module 238 may thereby be able to process questions and generate answers without sending any information over a network. In some approaches, security measures may be lowered for prompts being processed locally by machine learning module 238 and returned directly to user 207. For example, certain data may be provided to machine learning module 238 and analyzed locally, while that same data may be denied from being sent to machine learning module 213 over network 210 according to compliance metrics.

Additionally, because the machine learning module 238 is included at the electronic device 206, responses may be generated even when the connection to network 210 is lost. In still other approaches, the machine learning module 238 may coordinate with machine learning module 213 to perform different portions of requests received from user 207 in parallel, e.g., as would be appreciated by one skilled in the art after reading the present description.

Figure 3A:
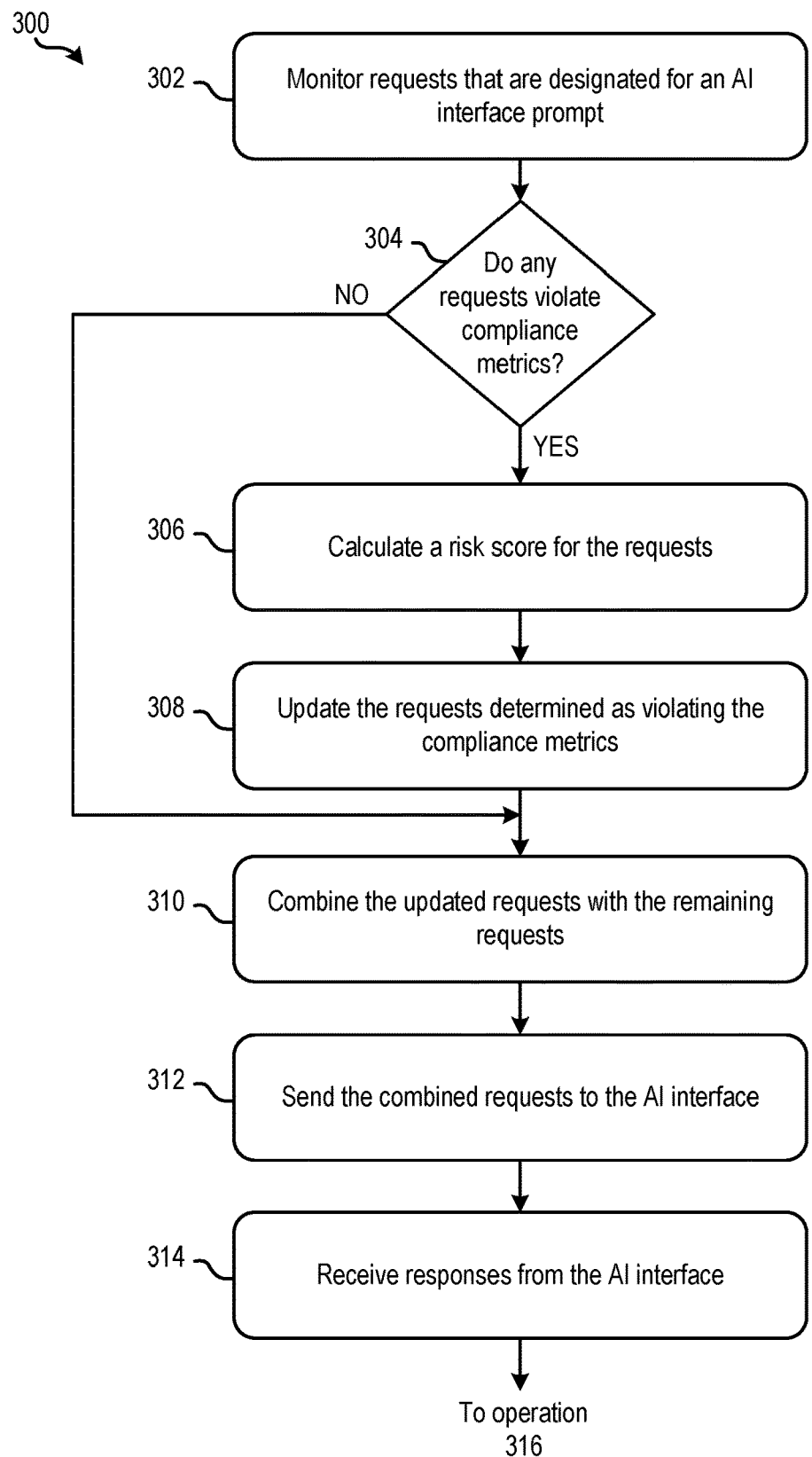
FIG. 3A is a flowchart of a method, in accordance with one approach.
Figure 3A:
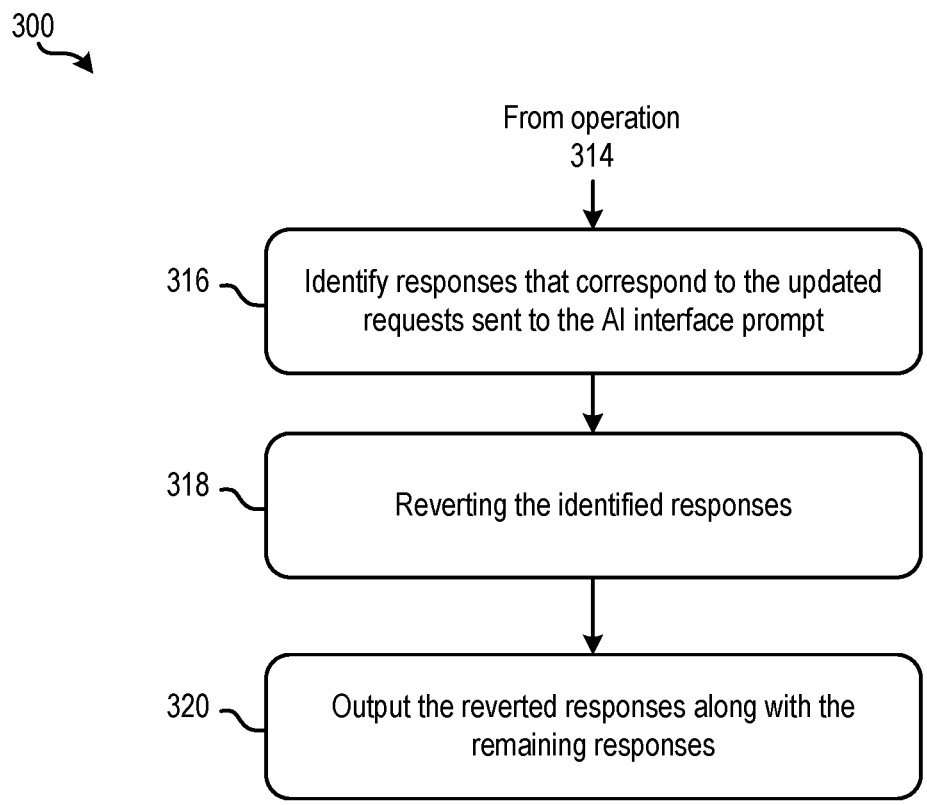

Looking now to FIG. 3A, a flowchart of a computer-implemented method 300 for implementing comprehensive privacy control in AI chatbots is illustrated in accordance with one approach. In other words, method 300 may be performed to ensure compliance with proprietary information access in human-computer interaction (HCI) environments. Method 300 may be performed in accordance with the present invention in any of the environments depicted in FIGS. 1-2, among others, in various approaches. Of course, more or less operations than those specifically described in FIG. 3A may be included in method 300, as would be understood by one of skill in the art upon reading the present descriptions.

Each of the steps of the method 300 may be performed by any suitable component of the operating environment using known techniques and/or techniques that would become readily apparent to one skilled in the art upon reading the present disclosure. For example, one or more processors located at a central server of a distributed system (e.g., see processor 212 of FIG. 2 above) may be used to perform one or more of the operations in method 300. In another example, one or more processors located at an edge server (e.g., see controller 217 of FIG. 2 above).

Moreover, in various approaches, the method 300 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 300. Illustrative processors include, but are not limited to, a central processing unit (CPU), an application specific integrated circuit (ASIC), a field programmable gate array (FPGA), etc., combinations thereof, or any other suitable computing device known in the art.

Looking to FIG. 3A, operation 302 includes monitoring requests that are designated for an AI interface prompt (also referred to herein as an "AI chatbot"). In other words, requests received from a user are preferably inspected and reviewed before being sent to a prompt providing a user access to an AI interface. A user's interactions with the AI interface through the prompt may thereby be monitored in real-time. It should also be noted that "AI interface" and "AI chatbot" as used herein is intended to refer to any type of computer program configured to implement AI, and preferably NLP, to interpret questions submitted by users and automate responses, simulating human conversation.

While an AI chatbot may be able to answer a wide array of questions, it is undesirable for certain types of information to be disclosed in unsecure and/or external prompts. Operation 304 thereby includes determining whether any of the requests designated for an AI interface prompt violate one or more compliance metrics. In other words, operation 304 determines whether any requests include information that should not be submitted to an AI interface prompt. It follows that in some approaches, compliance metrics are configured to search for certain types of information. For example, compliance metrics may be configured to scan received requests for usernames, credit card numbers, medical information, predetermined words (e.g., secret codewords), social security numbers, etc., and other types of private information. In other approaches, compliance metrics may be configured to search for requests that are received from a particular user, involve certain types of data operations (e.g., data write operations), directed to a particular location (e.g., over a network, to a local module, etc.), etc. It follows that operation 304 may apply any number and/or type of compliance metrics to identify (e.g., flag) certain ones of the requests that are being monitored.

For each of the requests determined as violating at least one compliance metric, method 300 proceeds from operation 304 to operation 306. There, operation 306 includes calculating a risk score for the respective request. In some approaches, the risk score may be calculated using weights that are correlated with different risk types. In other words, the risk score for a request received from a user which includes proprietary information may be calculated by multiplying the from risk type and weight. For example, a risk score may be calculated using Equation 1 below.

$$\text{Risk Score} = \sum \frac{(\text{weight} * \text{uncompliant item})}{N} \qquad \text{Equation 1}$$

Here, the risk score is calculated as the sum of the values calculated for each noncompliant request. Specifically, the "weight" is a coefficient that corresponds to each noncompliant item (e.g., word) in the request that is submitted. The weight values may be predetermined by users, generated using a machine learning module trained on previous performance, set by industry and/or user preferences, etc. Moreover, "N" represents the total number of noncompliant items (e.g., words) found in the respective request. In some approaches, the risk scores may be precalculated and organized in a lookup table. Operation 306 may thereby simply involve referencing a lookup table to determine a risk score previously calculated for a similar or the same type of request.

From operation 306, method 300 proceeds to operation 308. There, operation 308 includes updating the requests determined as violating the compliance metrics. As noted above, a risk score identifies a relative security risk associated with a request being submitted by a user. Thus, the risk scores calculated in operation 306 are used to determine which protective measures should be applied to the received requests before they are sent to a location assumed to have compromised data security, e.g., as will be described in further detail below in FIG. 3B.

In response to updating the requests determined as violating the compliance metrics by applying the protective measures to the requests, method 300 proceeds to operation 310. There, operation 310 includes combining the updated requests with the requests determined in operation 304 as not violating any compliance metrics. Accordingly, method 300 is also shown as proceeding from operation 304 directly to operation 310 for requests determined as not violating any compliance metrics.

Proceeding to operation 312, the updated requests are sent to the AI interface prompt along with those requests determined as not violating any compliance metrics. As a result, a backend (e.g., one or more machine learning models) of an AI interface may be used to process the updated requests along with requests that were not updated (e.g., modified).

Responses to the requests sent in operation 312 are eventually received from the AI interface. See operation 314. As noted above, different types of requests may be sent to the AI interface depending on the situation. For instance, some requests include questions that have been typed by a user using a computer keyboard, while other requests include audible inputs that have been spoken by the user.

Similarly, different types of responses may be received from the AI interface in operation 314. At least some of the responses received in operation 314 may be in a same format as the corresponding questions that were initially asked. Some questions may request that a specific type of response is returned and/or in a specific format. A response may thereby be translated into a desired type (e.g., format) at the AI interface before it is returned.

Some of the responses received in operation 314 correspond to requests that were modified before they were sent to the AI interface. As noted above, at least some requests may be modified to remove proprietary information and avoid it being submitted to an AI interface. The responses received from the AI interface may thereby be phrased differently than the initial requests that were received. For example, patient identifying information may be removed from medical data before being sent to an AI interface for analysis. Results from the analysis performed at the AI interface may thereby be devoid of any patient identifying information. While this may improve data security, a patient may wish the response to be specific to their patient information. Accordingly, it is desirable in some implementations to revert at least some of the responses received from the AI interface.

Operation 316 includes identifying responses that correspond to the updated requests sent to the AI interface prompt. In some approaches, operation 316 includes identifying responses that have a different form than the respective questions that were originally submitted. In other approaches, the requests determined as violating the compliance metrics in operation 304 may be flagged. In other approaches, the requests that are updated in operation 308 may be flagged, indicating the type of update (e.g., modification, translation, generation, etc.) performed on the respective requests. In such approaches, operation 316 may include searching for flagged requests in a lookup table.

Responses identified in operation 316 are preferably reverted to an intended form. See operation 318. These responses may be reverted by removing protective measures initially implemented to protect information being submitted in the requests. For instance, in some approaches predetermined words and phrases used in questions may be replaced with pseudonyms to prevent exposure of sensitive information. These pseudonyms may further be identified in the received responses to the questions. Identified pseudonyms may further be replaced with the predetermined words and phrases that were initially removed from the questions. Responses returned to a user are preferably formatted (e.g., phrased) such that the user can interpret the information being returned. Reverting language used in the responses to better match the original questions received from the users provides additional clarity and maintains consistency with the language used in a chat history.

Furthermore, operation 320 includes outputting the reverted responses along with the remaining responses. In other words, operation 320 includes outputting the responses reverted in operation 318, along with the responses that were not identified in operation 316. The combined responses may be output to a display screen for a user to read in some approaches. In other approaches, the combined responses may be printed out on paper, converted into audio signals and played on a speaker, stored in memory, used to train machine learning models, etc.

In response to performing operation 320, method 300 may end. However, it should be noted that although method 300 may end in response to performing operation 320, any one or more of the processes included in method 300 may be repeated in order to monitor and satisfy additional requests. In other words, any one or more of the processes included in method 300 may be repeated for additional requests received from users.

Figure 3B:
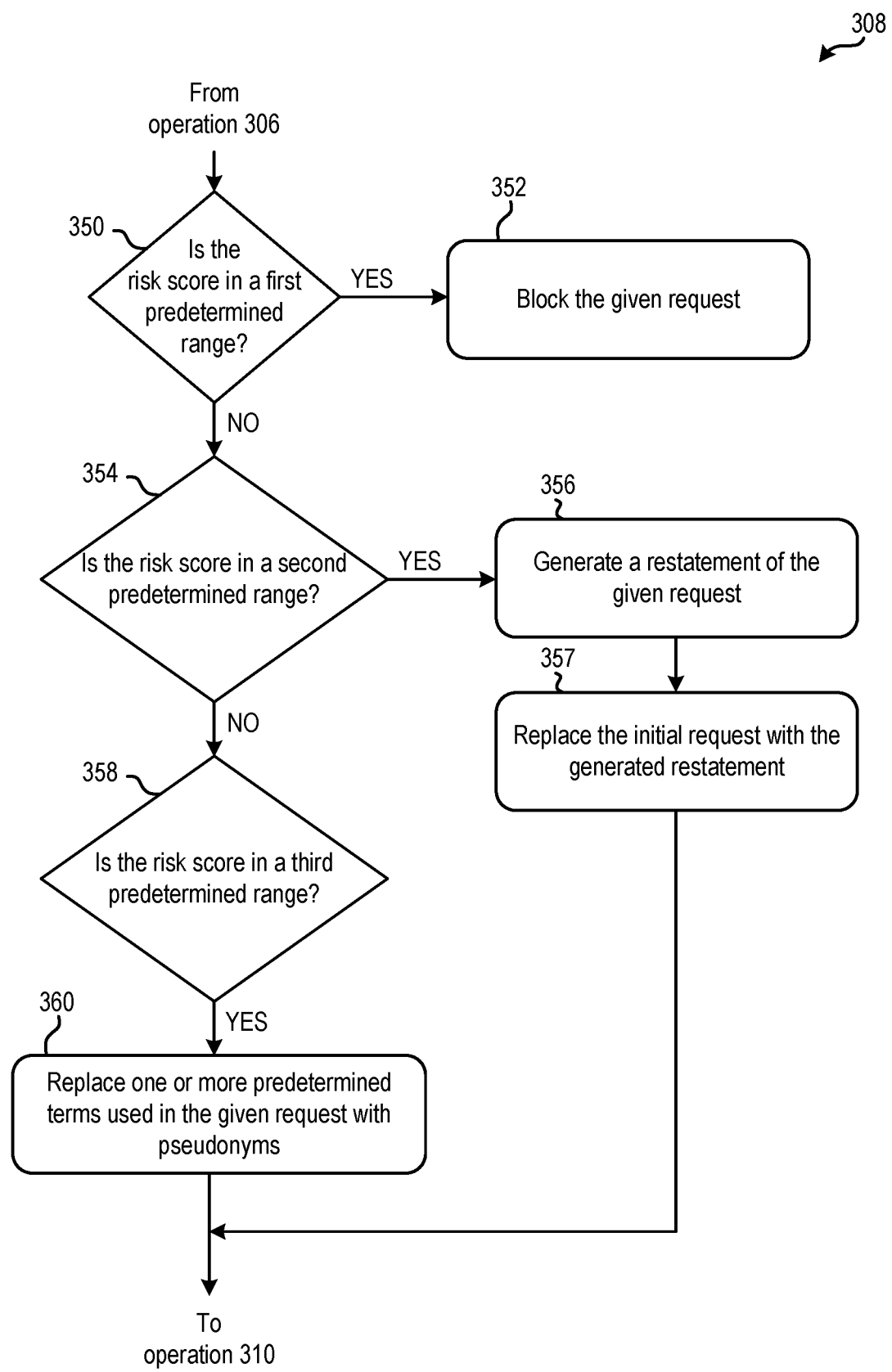
FIG. 3B is a flowchart of sub-processes for one of the operations in the method of FIG. 3A, in accordance with one approach.

Looking now to FIG. 3B, exemplary sub-operations of updating the requests determined as violating the compliance metrics are illustrated in accordance with one embodiment. These requests may be updated by implementing one or more protective measures that are correlated with the respective risk scores. It follows that sub-operations in FIG. 3B may be used to perform operation 308 of FIG. 3A. However, it should be noted that the sub-processes of FIG. 3B are illustrated in accordance with one embodiment which is in no way intended to limit the invention.

As shown, sub-operation 350 includes determining whether the risk score corresponding to the given request being evaluated is in a first predetermined range. In some approaches, the first predetermined range may correspond to a highest risk of experiencing undesired exposure of information. For example, risk scores in the first predetermined range may identify questions that include trade secrets, confidential information, medical information, etc.

In response to determining that the risk score corresponding to the given request is in the first predetermined range, the flowchart proceeds to sub-operation 352. There, sub-operation 352 includes blocking the given request. As noted above, risk scores in the first predetermined range may identify requests that pose a significant danger of exposing sensitive information. These requests may thereby simply be denied to avoid unnecessary risk of exposure.

Returning to sub-operation 350, the flowchart proceeds to sub-operation 354 in response to determining that the risk score corresponding to the given request is not in the first predetermined range. There, sub-operation 354 includes determining whether the risk score corresponding to the given request being evaluated is in a second predetermined range. The second predetermined range includes lower risk scores (e.g., numerical values) than the first predetermined range in some approaches. In other words, sub-operation 354 includes determining whether the request corresponds to a moderate risk of experiencing undesired exposure of information. For example, risk scores in the second predetermined range may identify questions that include project and/or product names, individual information, compensation information, etc.

In response to determining that the risk score corresponding to the given request being evaluated is in a second predetermined range, the flowchart proceeds to sub-operation 356. There, sub-operation 356 includes generating a restatement of the given request. In other words, sub-operation 356 includes rephrasing (e.g., recompiling) the request such that it conveys a same or a similar message, but using more general and non-sensitive terms. Moreover, operation 357 includes replacing the initial request with the generated restatement.

In some approaches, the restatement is generated using one or more machine learning models. The machine learning models may be trained by comparing the responses received for modified questions, with the initial questions originally received. This allows for the machine learning models to study how modifying questions received from a user impacts the accuracy of the resulting answer returned. The machine learning models are thereby able to adjust how questions are modified in an attempt to improve accuracy of the resulting answers, e.g., as would be appreciated by one skilled in the art after reading the present description.

Returning to sub-operation 354, the flowchart proceeds to sub-operation 358 in response to determining that the risk score corresponding to the given request being evaluated is not in the second predetermined range. There, sub-operation 358 includes determining whether the respective risk score is in a third predetermined range. Although not shown, an error may be output in response to determining that the risk score corresponding to the given request being evaluated is not in a third predetermined range.

However, in response to determining that the risk score corresponding to the given request being evaluated is in the third predetermined range, the flowchart proceeds to sub-operation 360. There, sub-operation 360 includes replacing one or more predetermined terms used in the given request with pseudonyms. For instance, the pseudonyms may include more generalized expressions for the predetermined terms. Replacing certain terms used in questions with the pseudonyms may thereby remove sensitive information, protecting it from being inadvertently exposed through an AI interface.

Requests modified by sub-operation 360 and/or replaced in sub-operation 357 may thereafter be combined in operation 310 of FIG. 3A as shown. It should be noted that the first, and/or second, and/or third predetermined ranges may be preset by an administrator, defined based on industry standards, set based on a current security status, etc. It should also be noted that "in a predetermined range" is in no way intended to limit the invention. Rather than determining whether a value is in a predetermined range, equivalent determinations may be made, e.g., as to whether a value is above a threshold, whether a value is outside a predetermined range, whether an absolute value is above a threshold, whether a value is below a threshold, etc., depending on the desired approach.

Figure 4:
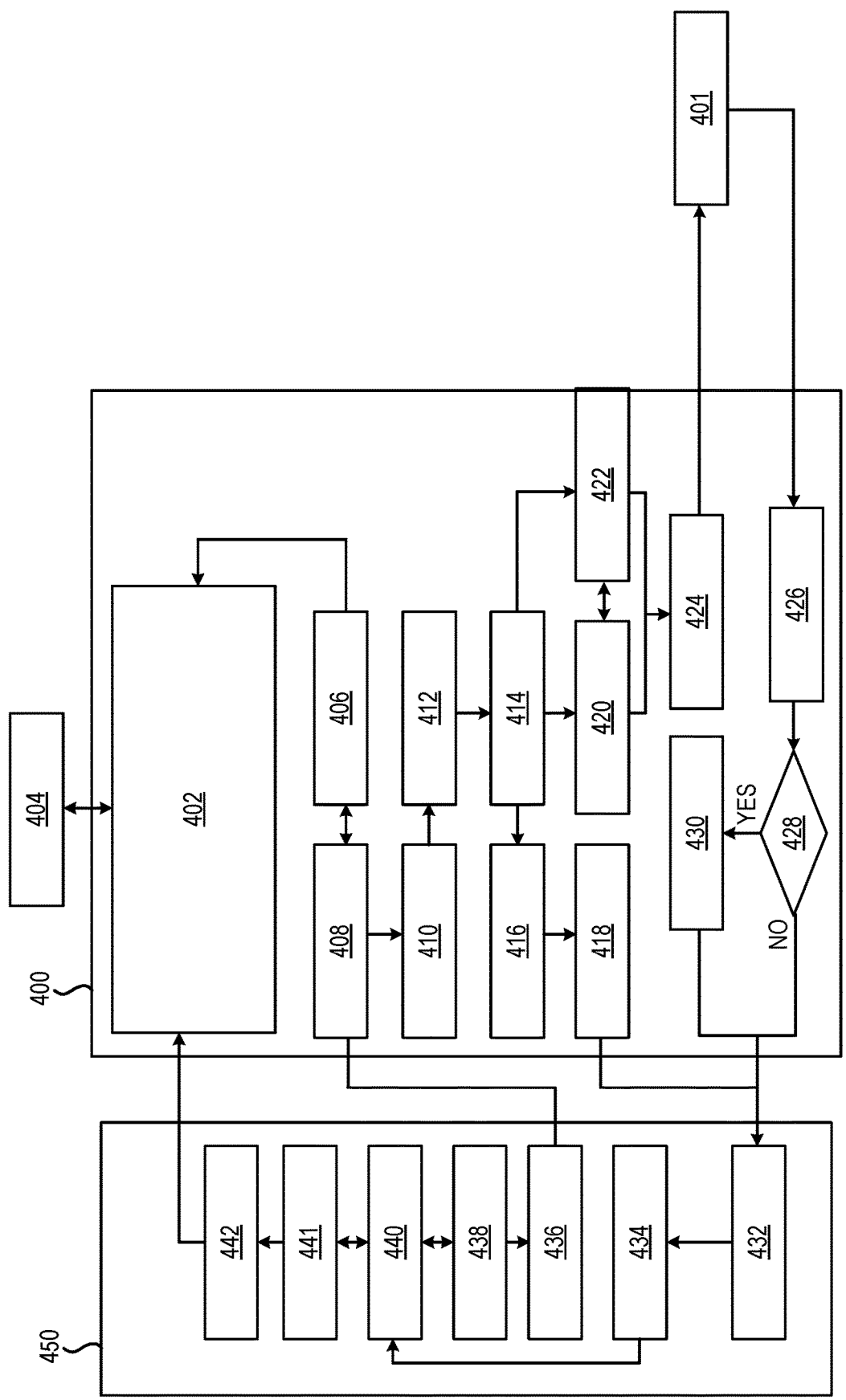
FIG. 4 is a detailed representational view of a distributed system, in accordance with one approach.

Referring now to FIG. 4, a more detailed view of various components that may be included in a prompt monitoring module 400 and a user location 450 are shown in accordance with one embodiment. As an option, the present monitoring module 400 and a user location 450 may be implemented in conjunction with features from any other embodiment listed herein, such as those described with reference to the other FIGS. For instance, any components in the prompt monitoring module 400 and/or user location 450 may be used in prompt monitoring module 208 and/or electronic devices 204, 206 of FIG. 2.

However, the prompt monitoring module 400 and/or user location 450 of FIG. 4 and others presented herein may be used in various applications and/or in permutations which may or may not be specifically described in the illustrative embodiments listed herein. Further, the prompt monitoring module 400 and/or user location 450 presented herein may be used in any desired environment. Thus FIG. 4 (and the other FIGS.) may be deemed to include any possible permutation.

As shown, the prompt monitoring module 400 and user location 450 are connected to each other such that information may be transferred therebetween. Depending on the approach, the prompt monitoring module 400 and user location 450 may be implemented at an edge node and directly coupled to each other. In other approaches, the prompt monitoring module 400 and user location 450 may be connected to each other over a shared network.

Similarly, prompt monitoring module 400 is shown as being connected to an AI chatbot 401. It should also be noted that the prompt monitoring module 400 may be implemented as a server application that is able to intercept user requests to ensure compliance with proprietary information access protocols in HCl situations. The AI chatbot 401 may include one or more trained machine learning models configured to generate responses to questions that are presented. Again, the connection between prompt monitoring module 400 and the AI chatbot 401 may include a direct connection, a network connection, etc., depending on the approach.

The prompt monitoring module 400 includes a manager 402. The manager 402 may provide a user interface that allows for configuring and managing comprehensive privacy control in AI chatbots. In other words, the manager 402 may be used to enable and/or disable method 300 from being performed according to one or more service profiles that are formed. The manager 402 may also be used in some approaches to define specific data structures in a data table with related algorithms for tracking proprietary information in a current AI chatbot. The manager 402 is also able to adjust chatbot guidance by categorizing noncompliant items (e.g., providing a risk type, weight, etc.), and prioritizing actions of the corresponding strategies.

An illustrative list of potential proprietary information and corresponding risk types includes, but is not limited to: customer and/or supplier lists including contact information and other details which may be considered trade secrets or confidential information; product designs (e.g., blueprints) of products and/or services that provide a company with a competitive advantage in the marketplace; manufacturing processes used to manufacture products; marketing and/or business strategies which give a company a competitive advantage in the marketplace; financial information (e.g., revenue, profit margins, costs, etc.); software and/or other algorithms used by a company; research and development (e.g., findings, data, results, etc.); human resource information (e.g., salaries, performance evaluations, personal details, etc.); etc.

The manager 402 may further include user profiles, made with permission of the corresponding users, that outline how requests from different types of users are processed. For example, chatbot guidance may describe how requests from the different users are processed. The manager 402 may also be used to determine how noncompliant items (e.g., requests) and other strategies are satisfied.

It follows that the manager 402 is able to provide guidance that may be customized by users to implement specific preferences and desires for different applications. For instance, the manager 402 may be able to provide guidance on how information should be classified based on its corresponding level of sensitivity and importance. This guidance helps users identify how to properly handle and protect information based on its classification. The manager 402 is also able to provide access controls in some approaches which include guidelines to ensure that only authorized employees have access to proprietary information. This includes appropriate password policies, security measures for sensitive information, and limiting access to specific employees based on a user's role or "need-to-know."

The manager 402 also includes information associated with any confidentiality agreements that correspond to the users. This helps users understand their responsibility to protect different types of proprietary information and the potential consequences of not doing so. Similarly, the manager 402 outlines how confidential information should be handled to ensure that users know how to properly handle confidential information, including storing and sharing such information. Users should also understand the proper use of specific devices and equipment while handling proprietary information, including policies regarding the use of personal devices. The manager 402 may further outline information regarding remote access, reporting of breaches, employee training, audits and monitoring, and compliance with regulations, e.g., such as General Data Protection Regulation (GDPR), Health Insurance Portability and Accountability Act (HIPAA), etc., and how they impact the handling of proprietary information.

The manager 402 is shown as being accessible to an admin 404. Accordingly, the compliance metrics and/or protective measures implemented by a manager 402 may be customized by the admin 404 or other third party which desirably avoids indirect information leak.

The manager 402 is also connected to a learner module 406 which may be used to inspect and analyze the present chatbot guidance by categorizing noncompliant items with risk type, weight, etc.; and prioritizing actions of the corresponded strategies. For instance, a user may input a new request that reads: "My company Iron-Pear is working with Sliver-Bear to deliver the next generation 3 nm GPU chip named "Tiger" targeted for 2023 Fall. Please tell me who potential customers will be for this new GPU chip?" Any terms used in this request that have been identified as proprietary information (e.g., in a list or lookup table) may be processed according to predetermined protective measures used to secure the information.

The learner module 406 is coupled to an analyzer 408, which is also shown as being connected to a request buffer 436 at the user location 450. The learner module 406 may be used to analyze requests designated for an AI chatbot (e.g., such as ChatGPT) in real-time. For instance, learner module 406 can screen the requests submitted to the request buffer 436 at the user location 450, and categorize them.

The analyzer 408 is also connected to an identifier 410 which is able to identify noncompliant items according to a learned chatbot guidance. For insurance, the identifier 410 is able to identify items in a request buffer that include personal information, e.g., such as email addresses, phone numbers, street addresses, and other types of sensitive personal and/or corporate information.

The identifier 410 passes this information to a risk score calculator 412 which is used to calculate a corresponding risk score. As noted above, risk scores may be calculated using weights that correspond to different types of risks. For instance, a risk score may be calculated for proprietary information in a user request using the corresponding risk type and weight. According to an example, which is in no way intended to limit the invention, the risk score may equal the sum of the weight coefficient for each noncompliant item (e.g., term), divided by the number of noncompliant items included in the given request. However, the risk type and corresponding weights assigned to the different risk types may be implemented differently, e.g., depending on instructions received from the admin 404.

The risk score calculator 412 passes the risk score values to the selector 414 which determines how each of the requests (e.g., questions) received should be handled. In other words, the selector 414 can select the protective actions that should be implemented for each request received. This determination may be made according to predefined and/or learned strategies to implement different levels of corrective actions.

For instance, requests determined as having a high enough risk are sent to the blocker 416 which simply blocks the requests from being sent to the AI chatbot 401 altogether. The blocker 416 notifies an alert agent 418 which sends a warning to the user location 450. These notifications sent from the alert agent 418 may thereby request a user issuing the request review and verify the identified noncompliant, give additional details, schedule an audit, etc.

However, requests determined to be less risky may be sent to the rephrasing module 420 and/or the pseudonym module 422 for processing. As noted above, the rephrasing module 420 may be used to generate a rephrasing of the initial request while maintaining the thrust of the question. Similarly, the pseudonym module 422 may be used to replace certain words in the request with pseudonyms.

The requester 424 is further used to accumulate the updated requests, before they are sent to the AI chatbot 401. Responses are also received from the AI chatbot 401 at the receiver 426. The receiver 426 thereby receives the answers and inspects the answers to determine whether additional processing is to be performed. For instance, decision 428 determines whether details in the answers received from the AI chatbot 401 should be restored. Answers that are to be restored are sent to restorer 430 which is used to remove one or more protective measures implemented before a request was sent to the AI module 401. For example, the restorer 430 may replace pseudonyms used in the answer with proprietary information originally removed from the questions submitted.

Looking to user location 450, module 432 is used to render the received and modified answers to the user 441. In other words, module 432 combines the responses before sending them to answer buffer 434 and eventually returning them along the AI chatbot connection 440 (e.g., running application). Furthermore, monitor module 438 can review requests being submitted to an AI chatbot (e.g., such as ChatGPT) in real-time. As shown, requests flagged by the monitor module 438 may be added to the request buffer 436 before being sent directly to the analyzer 408 for modification before actually being sent to the AI chatbot 401, e.g., as described above.

Returning to user location 450, the adjuster 442 is connected to the manager 402. The manager 402 may thereby work with the adjuster 442 to update the comprehensive privacy control implemented. In other words, the manager 402 may be used along with the adjuster 442 to update chatbot guidance by categorizing noncompliant items (e.g., providing a risk type, weight, etc.), and prioritizing actions of the corresponding strategies. The manager 402 and adjuster 442 are also able to verify compliance metrics and/or protective measures based on previous performance. The manager 402 and/or adjuster 442 may thereby implement one or more machine learning models, e.g., as would be appreciated by one skilled in the art after reading the present description.

Again, approaches herein are able to implement comprehensive privacy control for requests that are submitted to AI chatbots. Accordingly, users are able to interact with AI chatbots and other automated systems while also reducing the risk of inadvertently exposing sensitive information.

Accordingly, by implementing approaches herein in AI chatbot development, user privacy is protected while also ensuring compliance with various metrics and regulations.

Implementations herein can thereby perform digital transformations that allow for requests to be submitted to AI interfaces without risking data breaches, and improving the overall privacy and security of user data.

Figure 5:
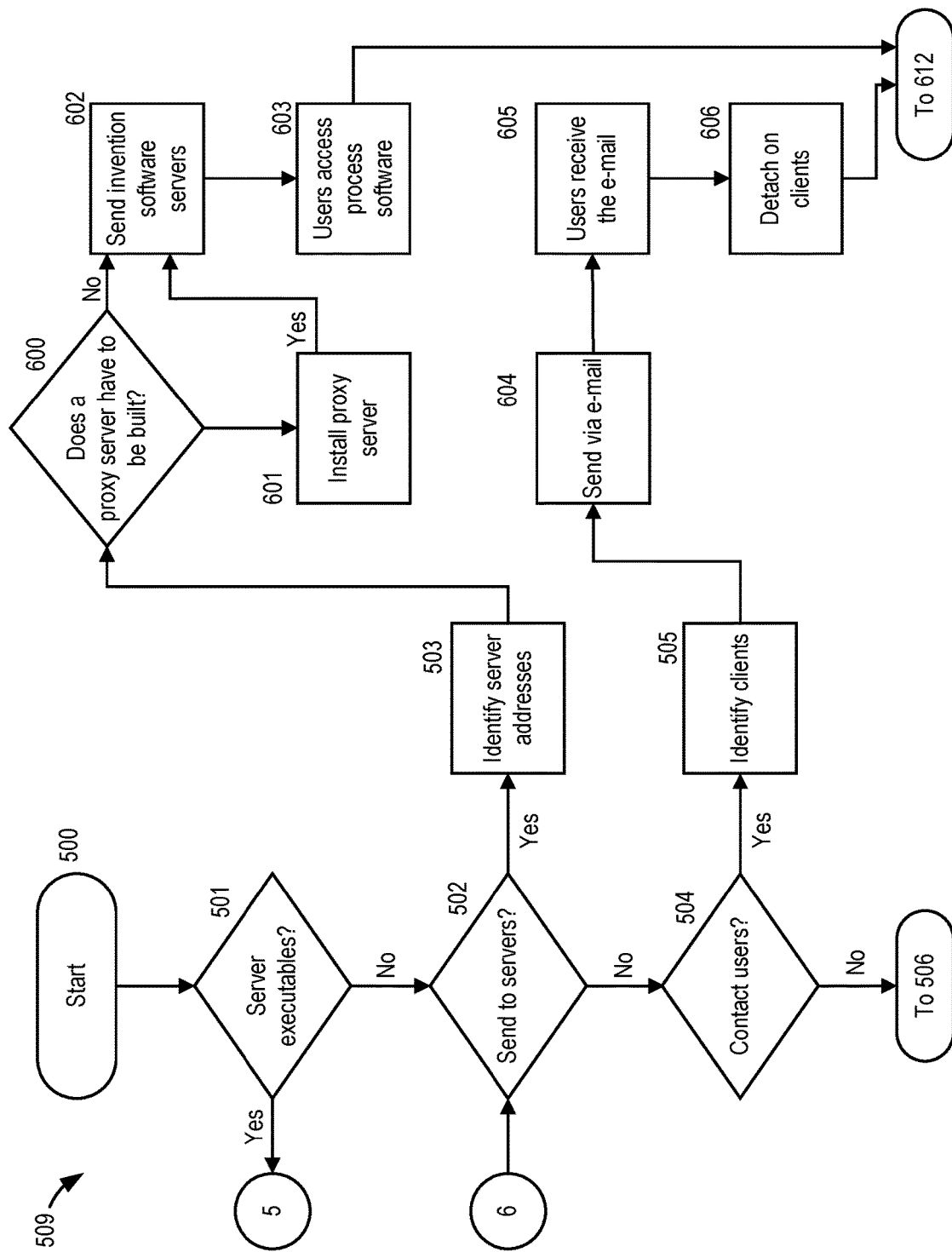
FIG. 5 is a flowchart of a method, in accordance with one embodiment of the present invention.
Figure 5:
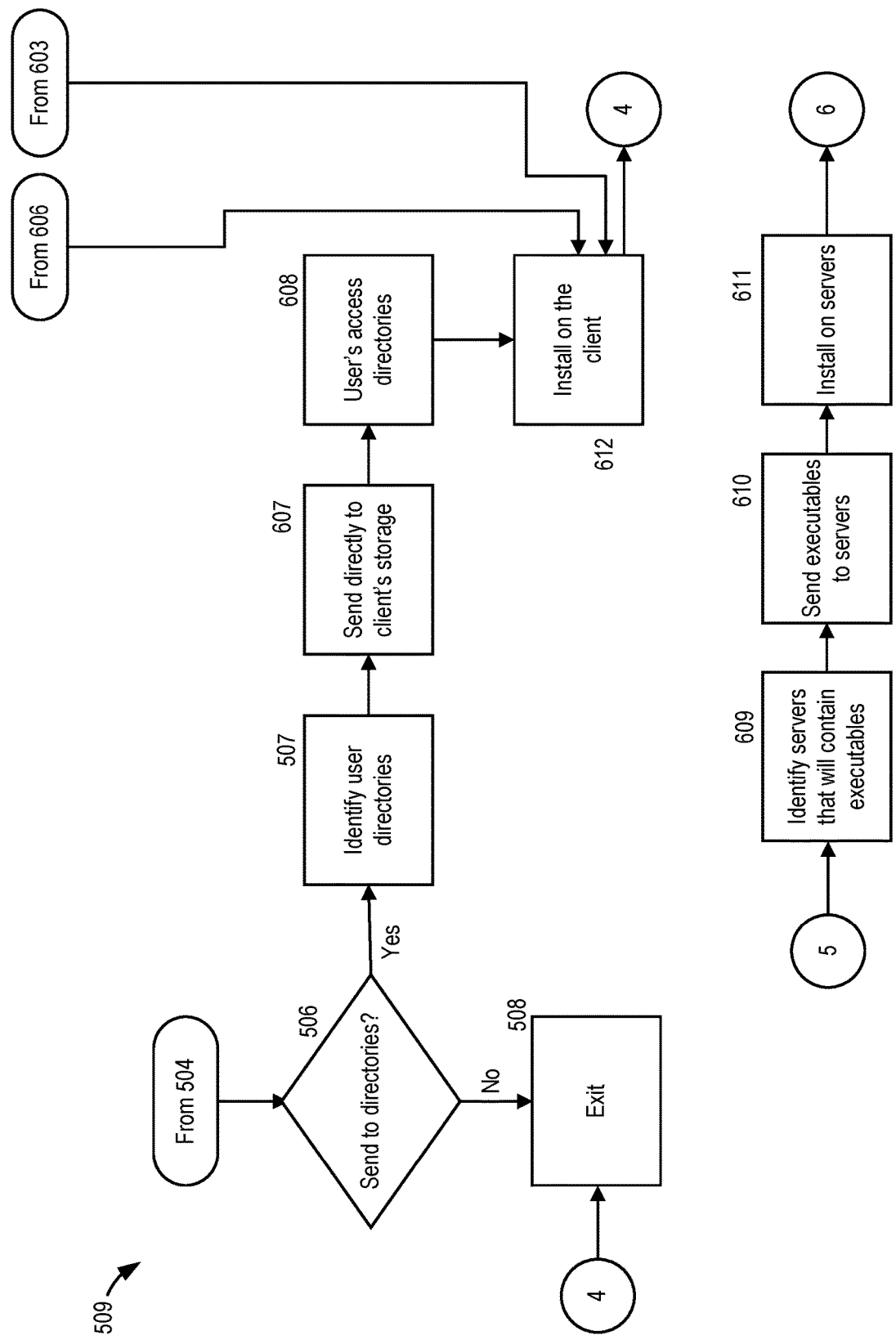

Now referring to FIG. 5, a flowchart of a method 509 is shown according to one embodiment. The method 509 may be performed in accordance with the present invention in any of the environments depicted in FIGS. 1-4, among others, in various embodiments. Of course, more or fewer operations than those specifically described in FIG. 5 may be included in method 509, as would be understood by one of skill in the art upon reading the present descriptions.

Each of the steps of the method 509 may be performed by any suitable component of the operating environment. For example, in various embodiments, the method 509 may be partially or entirely performed by a processing circuit, e.g., such as an IaC access manager, or some other device having one or more processors therein. The processor, e.g., processing circuit(s), chip(s), and/or module(s) implemented in hardware and/or software, and preferably having at least one hardware component, may be utilized in any device to perform one or more steps of the method 509. Illustrative processors include, but are not limited to, a central processing unit (CPU), an application specific integrated circuit (ASIC), a field programmable gate array (FPGA), etc., combinations thereof, or any other suitable computing device known in the art.

While it is understood that the process software associated with monitoring and modifying requests (e.g., questions) sent to an AI chatbot may be deployed by manually loading it directly in the client, server, and proxy computers via loading a storage medium such as a CD, DVD, etc., the process software may also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

With continued reference to method 509, step 500 begins the deployment of the process software. An initial step is to determine if there are any programs that will reside on a server or servers when the process software is executed (501). If this is the case, then the servers that will contain the executables are identified (609). The process software for the server or servers is transferred directly to the servers' storage via FTP or some other protocol or by copying though the use of a shared file system (610). The process software is then installed on the servers (611).

Next, a determination is made on whether the process software is to be deployed by having users access the process software on a server or servers (502). If the users are to access the process software on servers, then the server addresses that will store the process software are identified (503).

A determination is made if a proxy server is to be built (600) to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required, then the proxy server is installed (601). The process software is sent to the (one or more) servers either via a protocol such as FTP, or it is copied directly from the source files to the server files via file sharing (602). Another embodiment involves sending a transaction to the (one or more) servers that contained the process software, and have the server process the transaction and then receive and copy the process software to the server's file system. Once the process software is stored at the servers, the users via their client computers then access the process software on the servers and copy to their client computers file systems (603). Another embodiment is to have the servers automatically copy the process software to each client and then run the installation program for the process software at each client computer. The user executes the program that installs the process software on his client computer (612) and then exits the process (508).

In step 504 a determination is made whether the process software is to be deployed by sending the process software to users via e-mail. The set of users where the process software will be deployed are identified together with the addresses of the user client computers (505). The process software is sent via e-mail (604) to each of the users' client computers. The users then receive the e-mail (605) and then detach the process software from the e-mail to a directory on their client computers (606). The user executes the program that installs the process software on his client computer (612) and then exits the process (508).

Lastly, a determination is made on whether the process software will be sent directly to user directories on their client computers (506). If so, the user directories are identified (507). The process software is transferred directly to the user's client computer directory (607). This can be done in several ways such as, but not limited to, sharing the file system directories and then copying from the sender's file system to the recipient user's file system or, alternatively, using a transfer protocol such as File Transfer Protocol (FTP). The users access the directories on their client file systems in preparation for installing the process software (608). The user executes the program that installs the process software on his client computer (612) and then exits the process (508).

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
monitoring requests received for an artificial intelligence (AI) interface prompt in real-time;
determining whether one or more of the requests violate compliance metrics;
for requests determined as violating the compliance metrics:
calculating risk scores, and
determining whether the respective risk scores are in a first predetermined range and/or a second predetermined range;
in response to determining a risk score is inside the first predetermined range, blocking the corresponding request;

in response to determining a risk score is inside the
second predetermined range:
using a machine learning model to generate a restatement of the given request, and
replacing the given request with the restatement; and
sending the updated requests to the AI interface prompt.

2. The computer-implemented method of claim 1, comprising:
training the machine learning model by comparing the reverted portions of the responses with the respective requests determined as violating the compliance metrics.

3. The computer-implemented method of claim 1, comprising:
in response to determining that the respective risk score is not inside the second predetermined range, determining whether the respective risk score is in a third predetermined range; and
in response to determining that the respective risk score is inside the third predetermined range, replacing one or more terms used in the given request with pseudonyms.

4. The computer-implemented method of claim 1, comprising:
receiving responses to the updated requests from the AI interface;
identifying portions of the responses that correspond to the updated requests sent to the AI interface prompt;
reverting the identified portions of the responses by removing implemented protective measures; and
outputting the reverted portions of the responses along with remaining portions of the received responses.

5. The computer-implemented method of claim 4, wherein reverting the identified portions of the responses by removing the implemented protective measures, includes:
replacing pseudonyms used in the identified portions of the responses with terms removed from the requests determined as violating the compliance metrics.

6. A computer program product, comprising a computer readable storage medium having program instructions embodied therewith, the program instructions readable by a processor, executable by the processor, or readable and executable by the processor, to cause the processor to:
monitor requests received for an artificial intelligence (AI) interface prompt in real-time;
determine whether one or more of the requests violate compliance metrics;
for requests determined as violating the compliance metrics:
calculate risk scores, and determine whether the respective risk scores are in a first predetermined range and/or a second predetermined range;
in response to determining a risk score is inside the first predetermined range, block the corresponding request;
in response to determining a risk score is inside the second predetermined range:
use a machine learning model to generate a restatement of the given request, and
replace the given request with the restatement; and
send the updated requests to the AI interface prompt.

7. The computer program product of claim 6, wherein the program instructions are readable and/or executable by the processor to cause the processor to:
train the machine learning model by comparing the reverted portions of the responses with the respective requests determined as violating the compliance metrics.

8. The computer program product of claim 6, wherein the program instructions are readable and/or executable by the processor to cause the processor to:
in response to determining that the respective risk score is not inside the second predetermined range, determine whether the respective risk score is in a third predetermined range; and
in response to determining that the respective risk score is inside the third predetermined range, replace one or more terms used in the given request with pseudonyms.

9. The computer program product of claim 6, wherein the program instructions are readable and/or executable by the processor to cause the processor to:
receive responses to the updated requests from the AI interface;
identify portions of the responses that correspond to the updated requests sent to the AI interface prompt;
revert the identified portions of the responses by removing implemented protective measures; and
output the reverted portions of the responses along with remaining portions of the received responses.

10. The computer program product of claim 9, wherein reverting the identified portions of the responses by removing the implemented protective measures, includes:
replacing pseudonyms used in the identified portions of the responses with terms removed from the requests determined as violating the compliance metrics.

11. A system, comprising:
a processor; and
logic integrated with the processor, executable by the processor, or integrated with and executable by the processor, the logic being configured to:
monitor requests sent to an artificial intelligence (AI) interface prompt in real-time;
determine whether the requests sent to the AI interface prompt violate one or more compliance metrics;
for requests determined as violating the compliance metrics:
calculate risk scores, and
determine whether the respective risk scores are in a first predetermined range and/or a second predetermined range;
in response to determining a risk score is inside the first predetermined range, block the corresponding request;
in response to determining a risk score is inside the second predetermined range:
use a machine learning model to generate a restatement of the given request, and
replace the given request with the restatement; and
send the updated requests to the AI interface prompt.

12. The system of claim 11, wherein the logic is configured to:
in response to determining that the respective risk score is not inside the second predetermined range, determine whether the respective risk score is in a third predetermined range; and
in response to determining that the respective risk score is inside the third predetermined range, replace one or more terms used in the given request with pseudonyms.

13. The system of claim 11, wherein the logic is configured to:
receive responses to the updated requests from the AI interface;
identify portions of the responses that correspond to the updated requests sent to the AI interface prompt;

revert the identified portions of the responses by removing the implemented protective measures; and output the reverted portions of the responses along with remaining portions of the received responses.

\* \* \* \* \*